US012055770B2

(12) United States Patent
Baer et al.

(10) Patent No.: US 12,055,770 B2
(45) Date of Patent: Aug. 6, 2024

(54) COMBINATION TOOL FOR FIBER OPTIC FERRULE INSERTION AND REMOVAL

(71) Applicant: US Conec, Ltd, Hickory, NC (US)

(72) Inventors: Kolton Baer, Hickory, NC (US); Shelly Ann Buchter, Hickory, NC (US); Jillcha F. Wakjira, Hickory, NC (US); Jason Higley, Hickory, NC (US); Shubhrangshu Sengupta, Hickory, NC (US)

(73) Assignee: US Conec Ltd., Hickory, NC (US)

( * ) Notice: Subject to any disclaimer, the term of this patent is extended or adjusted under 35 U.S.C. 154(b) by 0 days.

(21) Appl. No.: 17/203,423

(22) Filed: Mar. 16, 2021

(65) Prior Publication Data

US 2021/0294048 A1 Sep. 23, 2021

Related U.S. Application Data

(60) Provisional application No. 62/990,707, filed on Mar. 17, 2020.

(51) Int. Cl.
G02B 6/38 (2006.01)
(52) U.S. Cl.
CPC .................................. *G02B 6/3898* (2013.01)
(58) Field of Classification Search
CPC .................................................. G02B 6/3898
See application file for complete search history.

(56) References Cited

U.S. PATENT DOCUMENTS

| 7,296,935 B1 | 11/2007 | Childers et al. |
| 9,291,781 B1 | 3/2016 | Zhou et al. |
| 10,133,009 B1 | 11/2018 | Wu et al. |
| 2013/0047800 A1* | 2/2013 | Wang ............... B25G 1/066 81/477 |
| 2016/0199986 A1* | 7/2016 | Tillinghast, III ...... A45D 29/02 30/176 |

FOREIGN PATENT DOCUMENTS

| JP | 10307232 A | * 11/1998 |
| WO | 2019111399 A1 | 6/2019 |

* cited by examiner

*Primary Examiner* — Sung H Pak
*Assistant Examiner* — Hoang Q Tran
(74) *Attorney, Agent, or Firm* — Michael L Leetzow PLLC; Shubhrangshu Sengupta

(57) ABSTRACT

A tool is used for inserting and removing an MT-type fiber optic ferrule from an adapter. The tool includes a handle having one or both of an insertion portion and a removal portion. An insertion head is movably coupled to the insertion portion of the handle. A removal head is movably coupled to the removal portion of the handle. The handle has opposing ends for the insertion portion and the removal portion. The handle may have other configurations. A sliding lock may be used to lock the rotatable insertion portion and rotatable removal portion in a fixed position relative to the handle.

16 Claims, 20 Drawing Sheets

COMBINATION TOOL FOR FIBER OPTIC FERRULE INSERTION AND REMOVAL

REFERENCE TO RELATED CASE

This application claims priority under 35 U.S.C. § 119 (e) to U.S. provisional application No. 62/990,707 filed on Mar. 17, 2020, the contents of which are hereby incorporated by reference in their entirety.

BACKGROUND OF THE INVENTION

MT-MPO adapters are used when an MT ferrule is directly mated to an MPO-type fiber optic connector using an MT-MPO adapter. One location where this may happen is at a backplane in which the MT ferrule side is inside a server rack unit. Being inside the server rack, it is therefore generally not exposed to dust and debris. The other side of the MT-MPO adapter receives MPO-type fiber optic connectors that are on the outside of the backplane. When an WIPO-type fiber optic connector is previously inserted on the MPO side of the MT-MPO adapter, a force of up to 20N must be overcome by the MT ferrule that is being inserted from the ferrule side, due to the newer designs of the MPO connectors.

MT ferrules are placed securely inside latches of the MT-MPO adapter by pushing the MT ferrule manually into the MT-MPO adapter. One such MT-MPO adapter is described in Applicant's U.S. Pat. No. 7,296,935. WIPO Publication No. WO 2019/111399 shows a jig that can be used to remove the MT ferrule from the MT-MPO adapter. The jig includes ramps that flare out the latches holding the MT ferrule in the MT-MPO adapter, resulting in the MT ferrule being freed from the MT-MPO adapter's latches. Some other MT-MPO adapters include living hinges directly attached to the adapter body that are used to detach the ferrule from the adapter. One such MT-MPO adapter is described in U.S. Pat. No. 10,133,009 ("the '009 patent").

In high-density fiber optic connector-adapter environments, there is often very little, if any, space for large jigs (such as the one shown in the aforementioned WIPO publication). MT-ferrule removal using a living hinge like the one shown in the '009 patent is dependent upon whether there is space for the tool or a user's fingers to properly push down on the living hinge to detach the MT ferrule. Further, the living hinge increases the size of the MT-MPO adapter while also having a moving part that may generate debris that can foul the end face of the MT ferrule. Further, conventional techniques for insertion of the MT ferrule are either manual and likely error-prone, or inaccurate in terms of proper alignment of the MT ferrule even when a tool is used.

Thus, there is a need for a tool that can be used to accurately and easily insert and remove the MT ferrule from the MT-MPO adapter. In at least one aspect, the tool would provide flexible positioning capabilities that allow the user to adjust to space constraints near the MT-MPO adapter while carrying out the intended actions at different angles.

SUMMARY OF THE INVENTION

The present invention is directed to a tool for inserting and removing an MT-type fiber optic ferrule from an adapter that includes a handle having an insertion portion and a removal portion, an insertion head movably coupled to the insertion portion of the handle, and a removal head movably coupled to the removal portion of the handle, the insertion head and the removal head can be inserted into the adapter to insert and/or remove an MT-type fiber optic ferrule from the adapter.

In some embodiments, the insertion head has two projections to engage a back side of the MT-type fiber optic ferrule.

In some embodiments, each of the projections have an outer ramped surface to engage and spread latches on the adapter.

In some embodiments, the insertion head has receptacles to receive a portion of guide pins extending from the MT-type fiber optic ferrule whereby the guide pins do not engage the insertion head.

In some embodiments, the insertion head has a plurality of recesses and the recesses are configured to receive a projection associated with the handle, the insertion head being in a fixed position relative to the handle when the projection is inserted into one of the plurality of recesses.

In yet another aspect, there is a tool for inserting and removing an MT-type fiber optic ferrule from an adapter that includes a handle that has a removal portion, and a removal head movably coupled to the removal portion of the handle, the removal head can be inserted into the adapter to engage and remove an MT-type fiber optic ferrule inserted into the adapter.

In some embodiments, the insertion head has a plurality of recesses and the recesses are configured to receive a projection associated with the handle, the insertion head being in a fixed position relative to the handle when the projection is inserted into one of the plurality of recesses.

In some embodiments, the removal head fits inside an opening in the adapter that is configured to receive the MT-type fiber optic ferrule.

In yet another aspect, there is combination tool for handling an MT-type fiber optic ferrule that includes a handle and a moveable head movably coupled to the handle, the moveable head is configured to engage an MT-type fiber optic ferrule to either release the MT-type fiber optic ferrule from an adapter or to insert the MT-type fiber optic ferrule into the adapter.

In some embodiments, the moveable head is rotatably coupled to the handle.

In some embodiments, the movable head is rotatable between a first position and a secure second position relative to the handle.

It is to be understood that both the foregoing general description and the following detailed description of the present embodiments of the invention are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

DETAILED DESCRIPTION OF THE INVENTION

Figure 1:
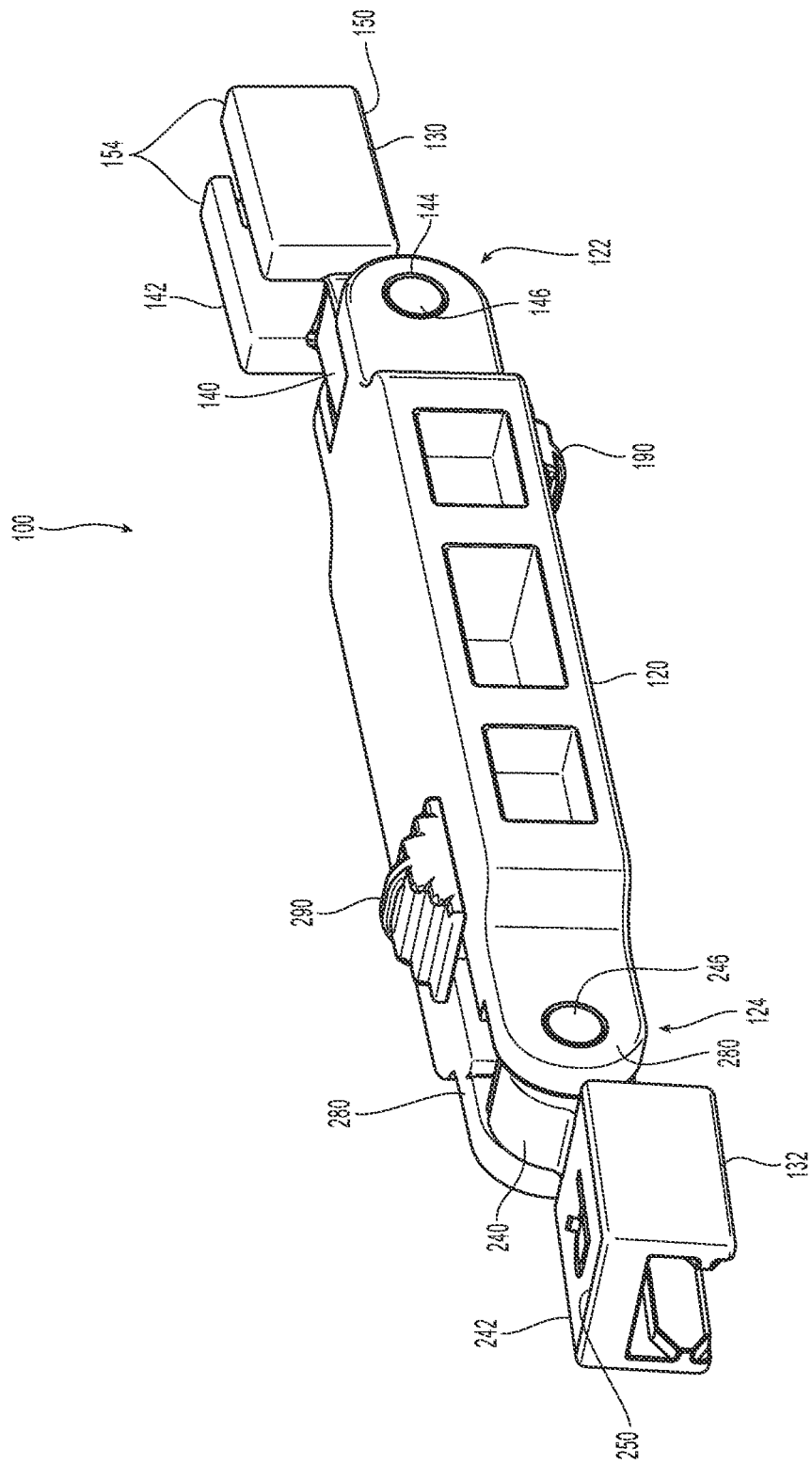
FIG. 1 is a side perspective view of one embodiment of a tool for inserting and removing an MT-type fiber optic ferrule from an adapter according to the present invention.

Reference will now be made in detail to the present preferred embodiment(s) of the invention, examples of which are illustrated in the accompanying drawings. Whenever possible, the same reference numerals will be used throughout the drawings to refer to the same or like parts.

Figure 2:
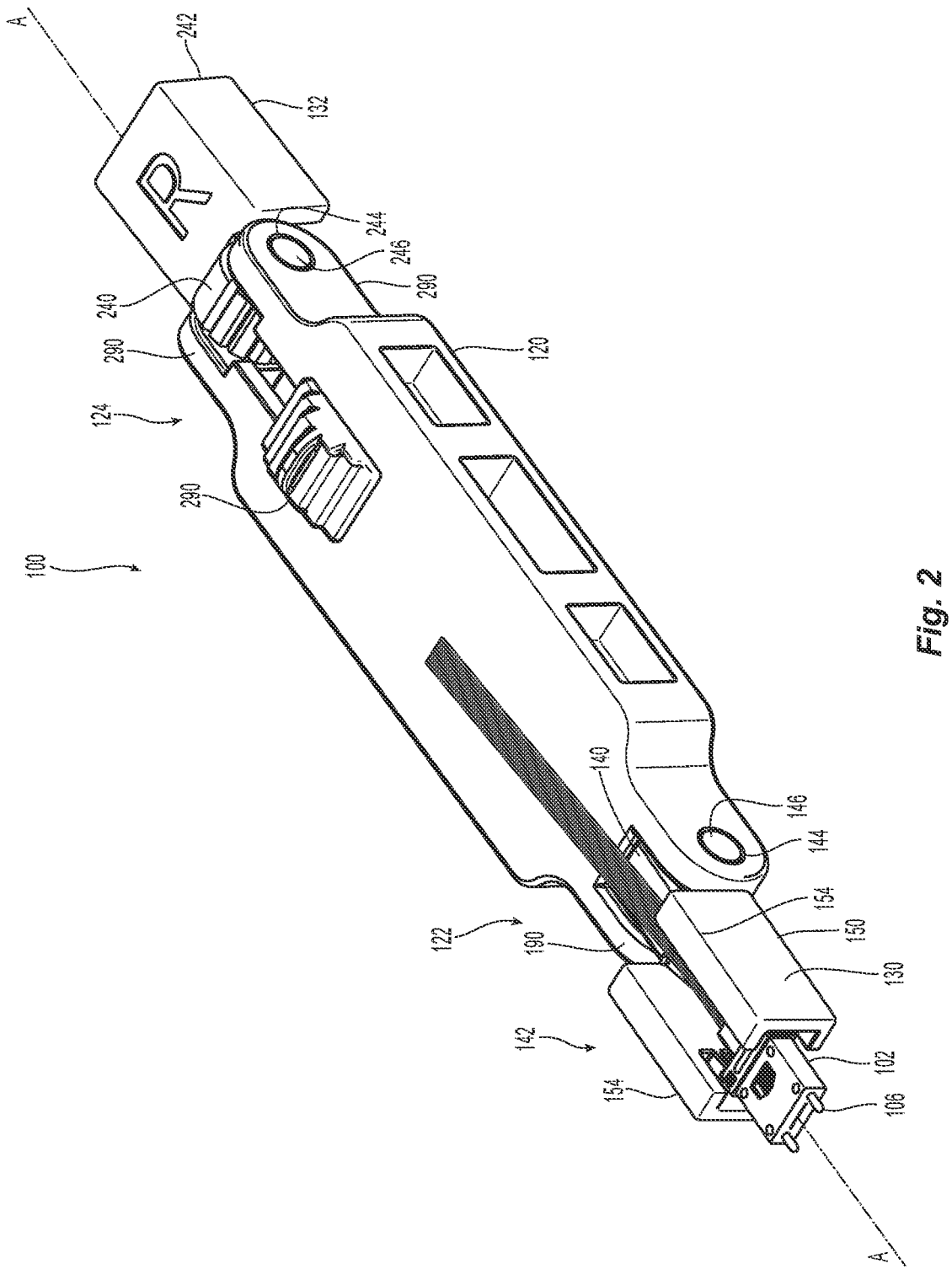
FIG. 2 is a bottom perspective view the tool in FIG. 1.
Figure 11:
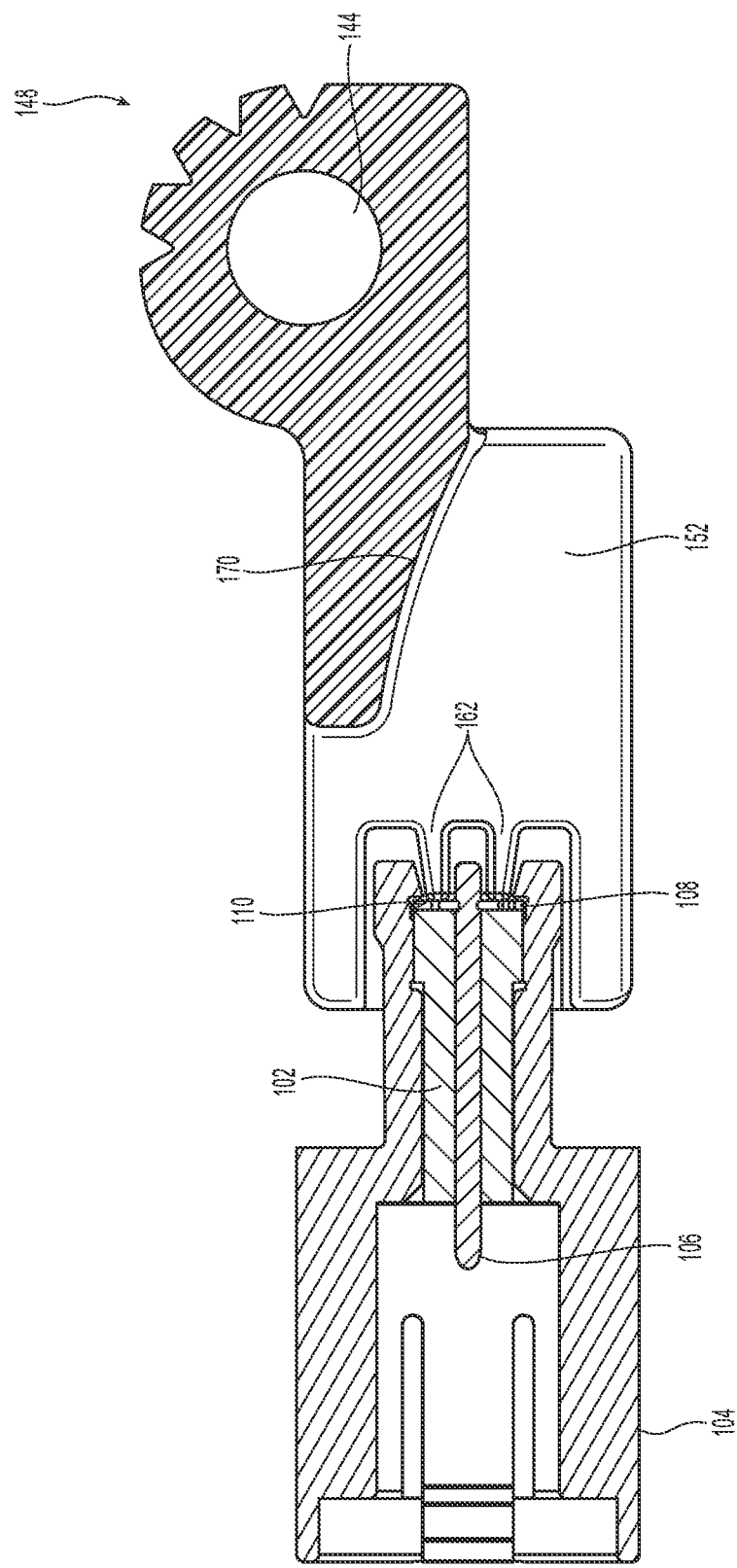
FIG. 11 is cross section of the MT-type fiber optic ferrule, the tool in FIG. 1, and the MP-MPO adapter.
Figure 12:
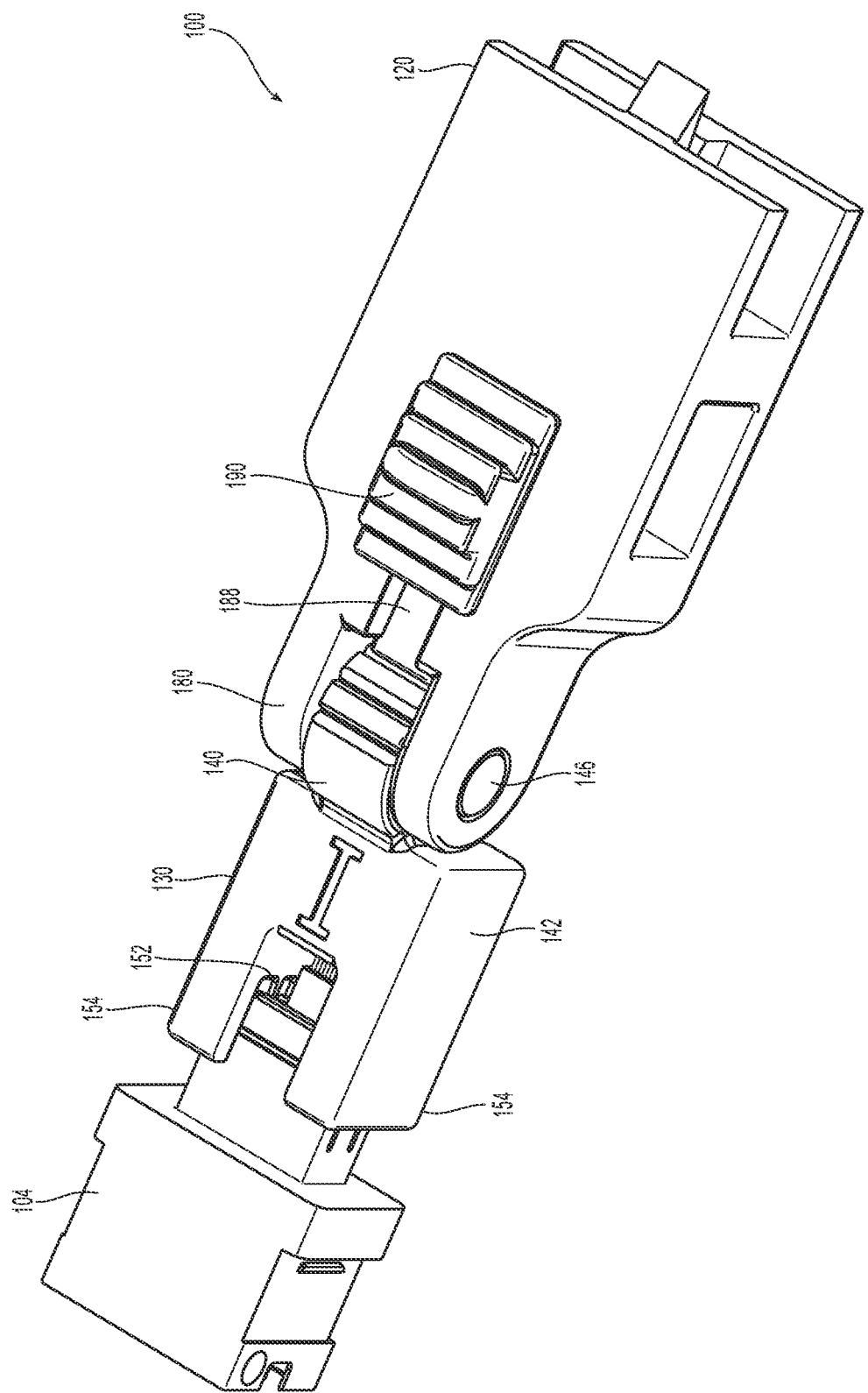
FIG. 12 is a top perspective view of the MT-type fiber optic ferrule, the tool, and the MP-MPO adapter in FIG. 11.

As illustrated in the figures, a tool 100 for inserting and removing an MT-type fiber optic ferrule 102 (see, e.g., FIG. 2) from an adapter 104 (see, e.g., FIG. 11) is provided, in accordance with various aspects of this disclosure. Turning to the MT-type fiber optic ferrule 102, the MT-type fiber optic ferrule 102 is known in the art. The MT-type fiber optic ferrule 102 may have guide pins 106 that are used to align the MT-type fiber optic ferrule 102 with another MT-type fiber optic ferrule. The MT-type fiber optic ferrule 102 preferably has a pin clamp or other structure 108 to retain the guide pins 106 within the fiber optic ferrule 102. The pin clamp or other structure 108 is typically at the back face 110 of the fiber optic ferrule 102. See FIG. 11. However, MT-type fiber optic ferrule 102 need not have the guide pins 106, which can be disposed within the other MT-type fiber optic ferrule.

The adapter 104 is also known in the art. See, e.g., Applicant's U.S. Pat. No. 7,296,935. WIPO Publication No. WO 2019/111399 shows a jig to remove the ferrule from the MT-MPO adapter. Both these documents are incorporated herein by reference in their entireties. The adapter 104 allows for an MPO connector (with another MT-ferrule, housing(s) and other components) to align and connect with a plain MT-type fiber optic ferrule that is inserted on the opposite side of the adapter 104. The present invention allows for easier removal of the MT-type fiber optic ferrule 102 from the adapter 104 using the tool 100—reducing and/or eliminating stress placed on the optical fibers that are the secured within the MT-type fiber optic ferrule 102 during removal.

Returning to the tool 100, the tool 100 has a handle 120 with an insertion portion 122 and a removal portion 124 and a longitudinal axis A. While the insertion portion 122 and the removal portion 124 are on opposing ends of the elongated handle 120, the handle 120 could take other shapes. For example, it could have a u-shape, a c-shape, or other shape that still allows both the insertion portion 122 and a removal portion 124 to be used. Further, a part of the body of the handle 120 may be made flexible, e.g., between the insertion portion 122 and the removal portion 124, which may allow the tool 100 to change between a straight shape (shown in the figures) to the aforementioned u-shaped or c-shaped configurations. Referring to FIG. 1, the tool 100 has an insertion head 130 movably coupled to the insertion portion 122 of the handle 120. Similarly, the removal head 132 is movably coupled to the removal portion 124 of the handle 120. In this respect, one embodiment of the tool 100 is a combination tool since the same tool 100 may be used for both insertion and removal of the MT ferrule. As illustrated, the insertion head 130 and the removal head 132 are pivotally movable relative to the handle 120. As illustrated below in other embodiments, they may also be slidingly or translationally movable relative to the handle 120. The insertion head 130 and the removal head 132 can be used with the adapter (e.g., 104) to insert and/or remove an MT-type fiber optic ferrule from the adapter.

Figure 3:
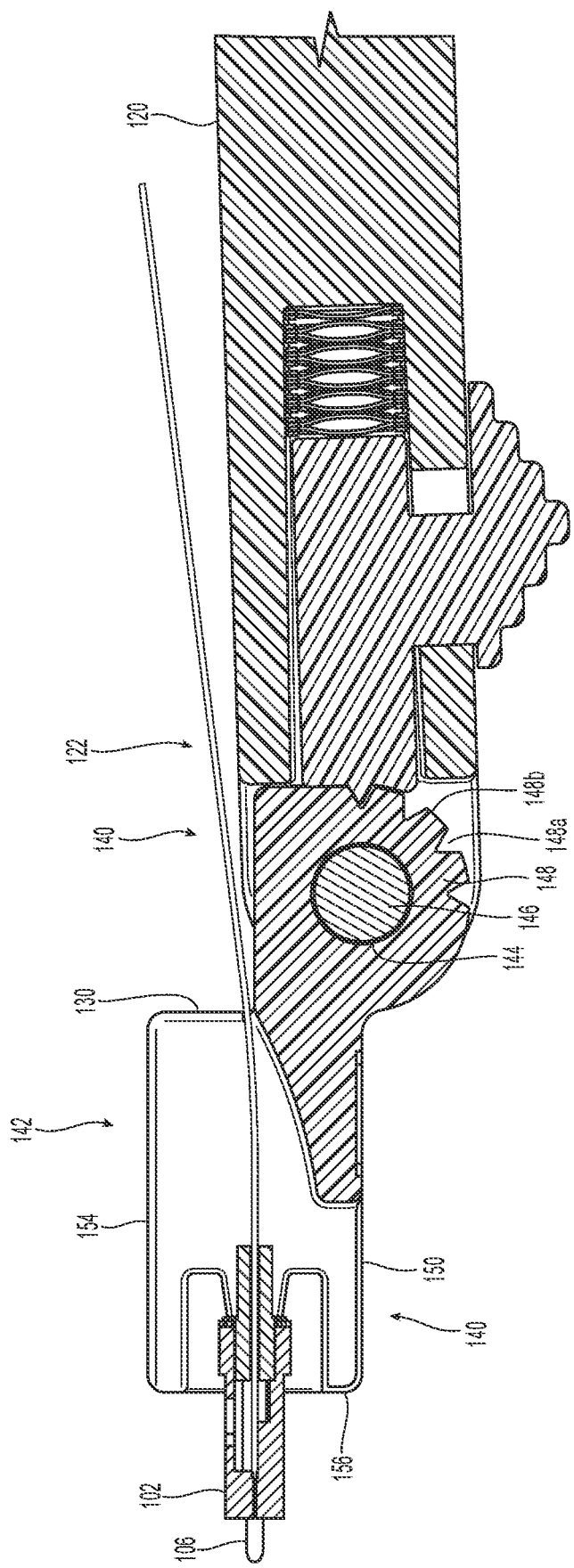
FIG. 3 is cross sectional view of the insertion portion of the tool in FIG. 1.
Figure 8:
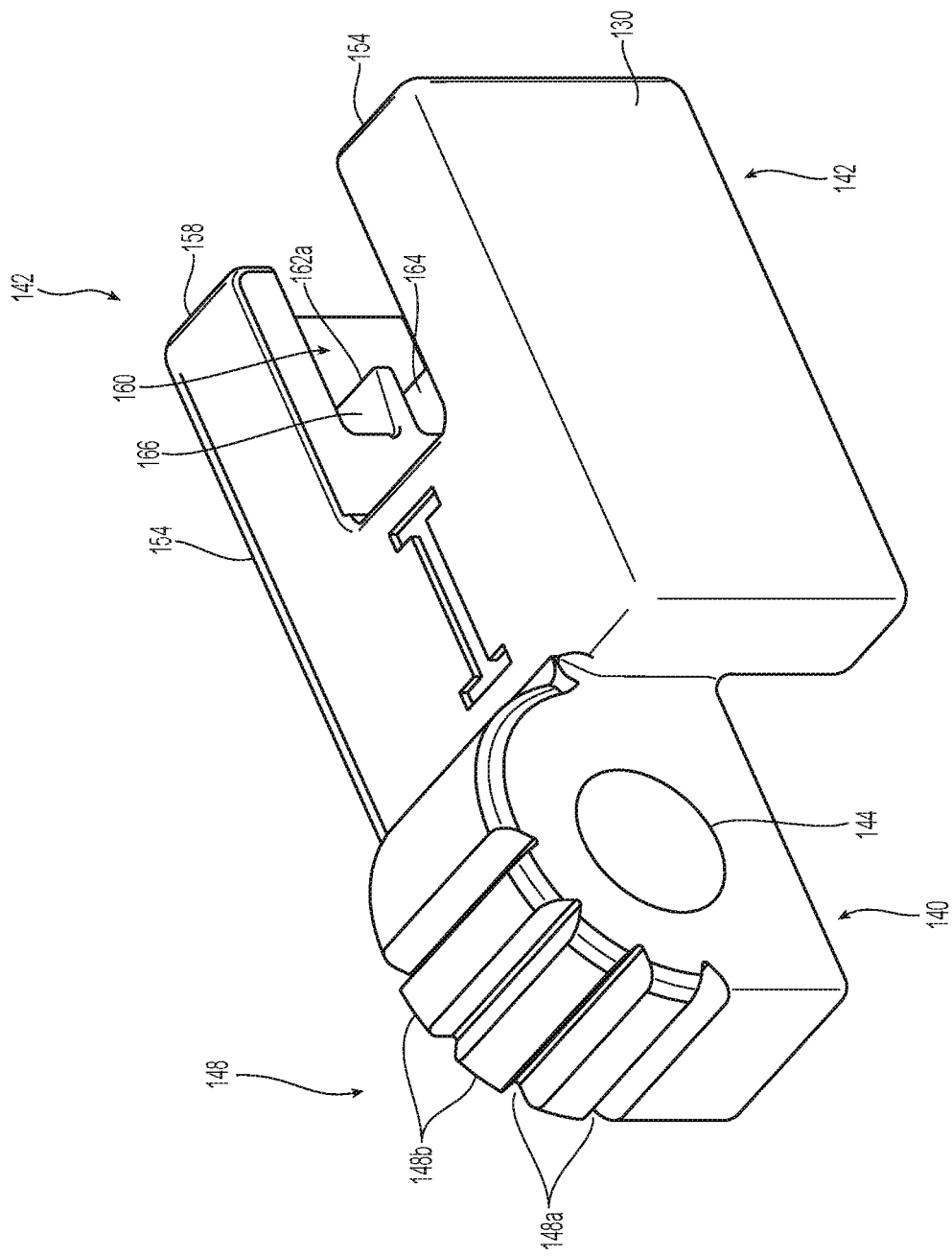
FIG. 8 is a perspective view of the bottom side of the insertion head of the tool in FIG. 7.

Referring to FIGS. 3 and 8, the insertion head 130 has a first portion 140 to engage the handle 120 and a second portion 142 to engage the adapter 104 and the MT-type fiber optic ferrule 102. The first portion 140 as best seen in FIG. 8, has a pin hole 144 to receive a pin 146 and about which the insertion head 130 can rotate relative to the handle 120. Such rotation of the insertion head 130 moves the insertion head 130 in different positions about the handle 120. The first portion 140 also has a circular portion 148 with a plurality of recesses 148a and a plurality of cogs or projections 148b arranged around a portion of the periphery of the circular portion 148. The plurality of recesses 150 and the plurality of cogs or projections 152, in combination with a projection disposed in the handle 120 as described below in more detail, allow for a user to rotate the insertion head 130 relative to the handle 120 to allow the best approach to the adapter 104 when inserting an MT-type fiber optic ferrule 102 in the adapter 104. It should also be noted that the second portion 142 is offset from the center of the first portion 140 (the center of the pin hole 144). The center of the pin hole 144 is longitudinally aligned with a bottom surface 150 of the second portion 142, but it could aligned with other parts of the second portion 142, as long as the tool 100 would still be able to function as described herein.

The second portion 142 has an opening 152 that is at least partially defined by two head extensions 154, the opening 152 allowing at least a portion of the adapter 104 to be received therein. See FIG. 7. The second portion 142, and the head extensions 154 in particular, have at a front end 156 two c-shaped portions 158 that contain structures to allow for easier insertion of the MT-type fiber optic ferrule 102. Within cutouts 160 of the head extensions 154 are bumps 162, with two bumps 162 on each side of the opening 152. See FIGS. 7-11. The two bumps 162 on each side have a plurality of functions. First, the bumps 162 have a front facing surface 162a that engages the pin clamp or other structure 108 is typically at the back face 110 of the fiber optic ferrule 102. When the tool 100 is positioned in front of the adapter 104 to push the MT-type fiber optic ferrule 102 into the adapter 104, the bumps 162 (on each side) are preferably the only surfaces of the tool 100 to engage the back of the MT-type fiber optic ferrule 102 (directly or via the pin clamp 108, if present). However, there may be additional structures in the insertion head 130 used to perform the same function.

The bumps 162 on each side are spaced apart from one another to provide a guide pin protection space 164 that allows a portion of the guide pins 106 to fit between the bumps 162. This allows the guide pins 106 to avoid having any pressure on them from the back that may affect the alignment with the MPO connector to be installed on the other side of the adapter 104. The bumps 162 also have outer surfaces 166 (i.e., the top and bottom surfaces) that are slanted to form a latch ramp. As discussed in more detail below, as the tool 100 is inserted into the adapter 104, adapter latches (used to secure the MT-type fiber optic ferrule 102 within the adapter) are forced apart to allow for insertion of the MT-type fiber optic ferrule 102 between the adapter latches. See FIG. 11. It should be noted that above and below the latch ramps 166 is a space 168 that can receive at least a portion of the adapter latches.

Figure 7:
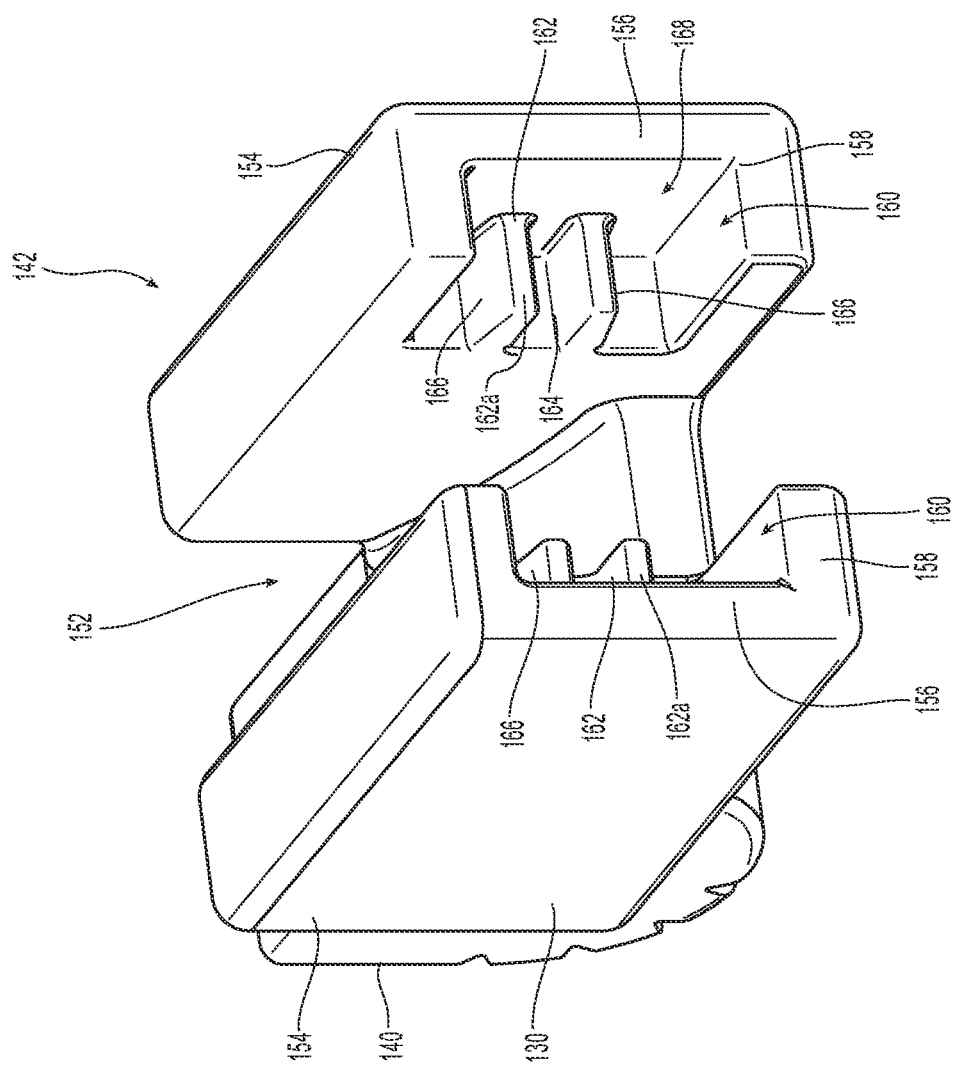
FIG. 7 is an end view of the insertion head of the tool in FIG. 1.
Figure 9:
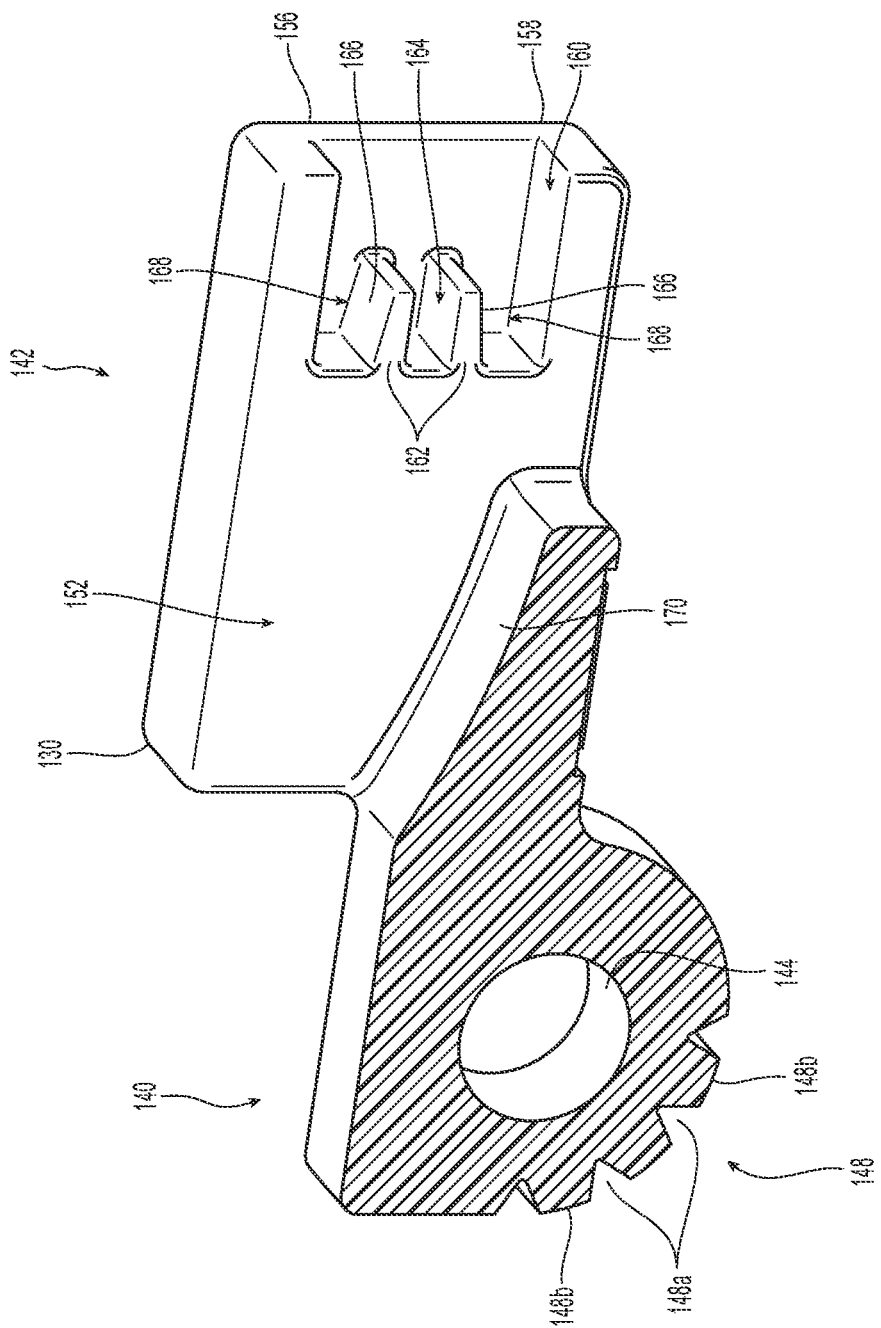
FIG. 9 is cross section view of the insertion head in FIG. 7.
Figure 10:
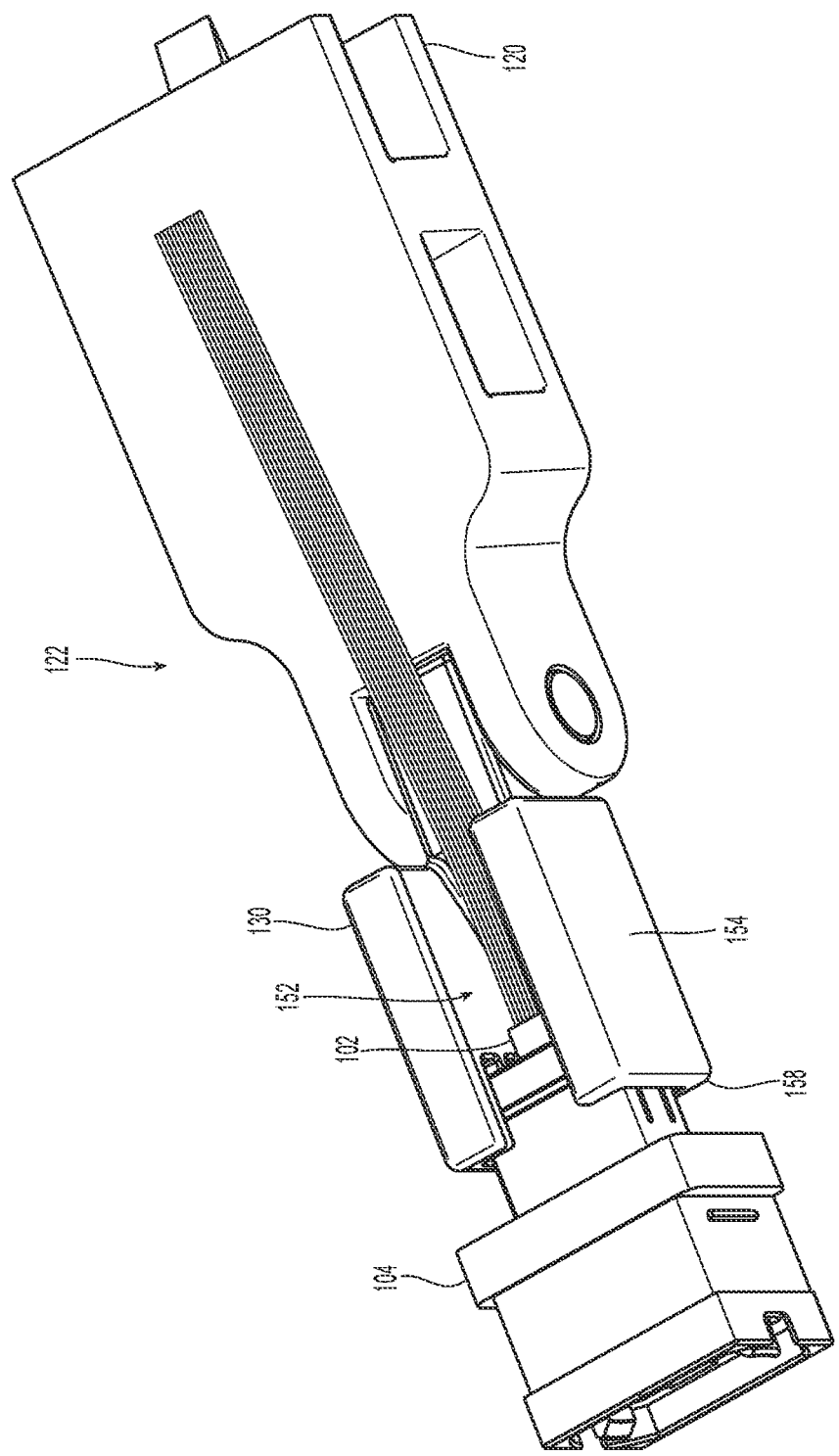
FIG. 10 is a top perspective view of an MT-type fiber optic ferrule in the insertion head of the tool in FIG. 1 being inserted into an MP-MPO adapter.

As best illustrated in FIGS. 7, 9, and 10, there is an optical fiber ramp 170 that is disposed between the two head extensions 154. As is known in the art, the MT-type fiber optic ferrule 102 to be inserted into the adapter 104 would already have optical fibers (typically an optical fiber ribbon) secured therein. The optical fiber ramp 170 allows for appropriate handling of the optical fibers to prevent any bending or breaking thereof. It is also prevents the optical fibers from getting caught on other structures. The insertion head 130 may also have indicia on one side thereof to allow for easier recognition of the particular head (insertion head 130 or removal head 132). For example, the letter I may be present on the insertion head 130. The condition may be molded into, carved into, painted on, applied on or affixed to the head in any appropriate manner.

Figure 4:
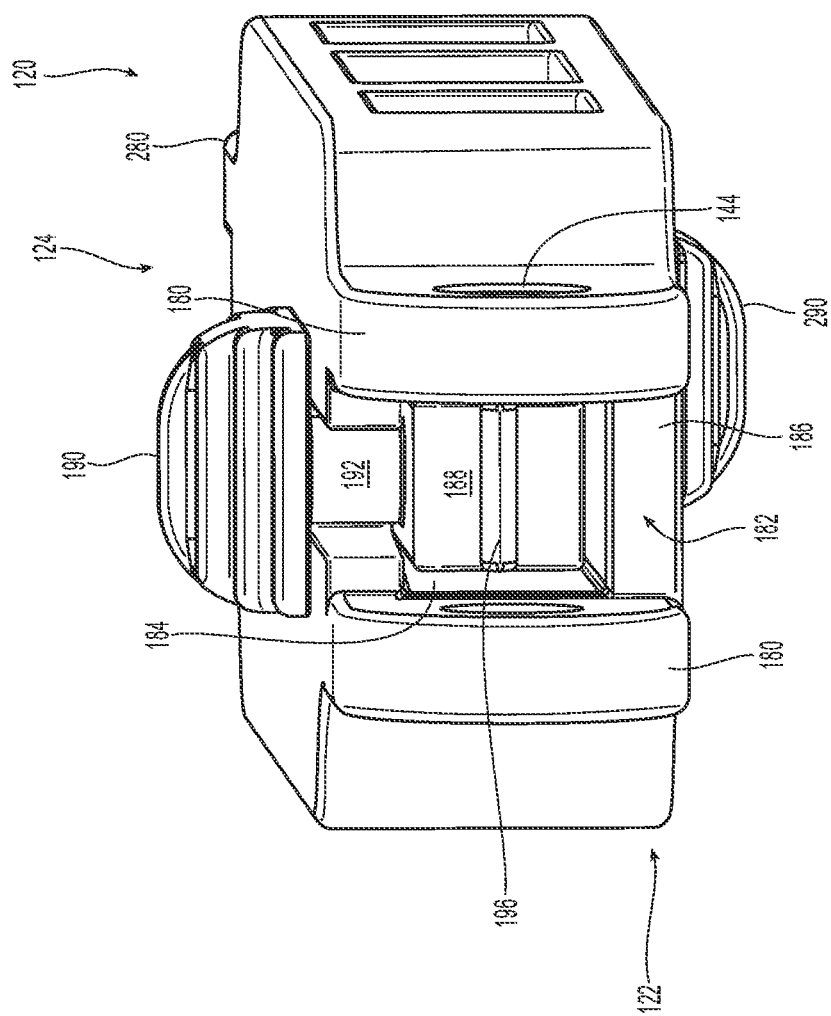
FIG. 4 is an end view of the tool in FIG. 1.
Figure 5:
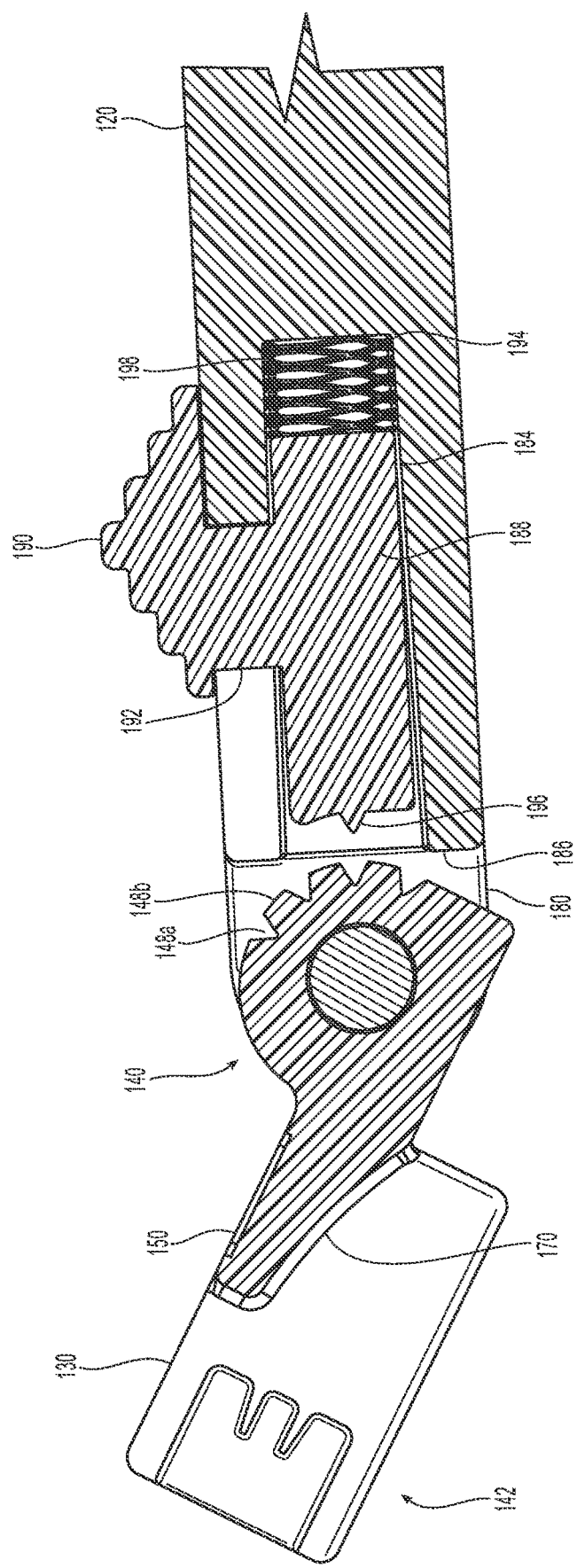
FIG. 5 is a cross sectional view of the insertion portion of the tool in FIG. 1 with the projection removed from the recesses in the insertion head.

The handle 120 has at the insertion portion 122 two tabs 180 to define a receiving space 182 to receive therein the first portion 140 of the insertion head 130 (see, FIGS. 4 and 5). The handle 120 has a lock cavity 184 in communication with the receiving space 182. Facing into the receiving space 182 and below the lock cavity 184 is a stop surface 186 to prevent the over rotation of the insertion head 130. Disposed within the lock cavity 184 is a lock beam 188 attached to a lock tab 190 by way of a lock neck 192. The handle 120 also includes a spring cavity 194 that is at least partially in communication with the lock cavity 184. Disposed within the spring cavity 194 is an elastic element 198, preferably a circular spring to bias the lock beam 188 toward the receiving space 182.

Figure 6:
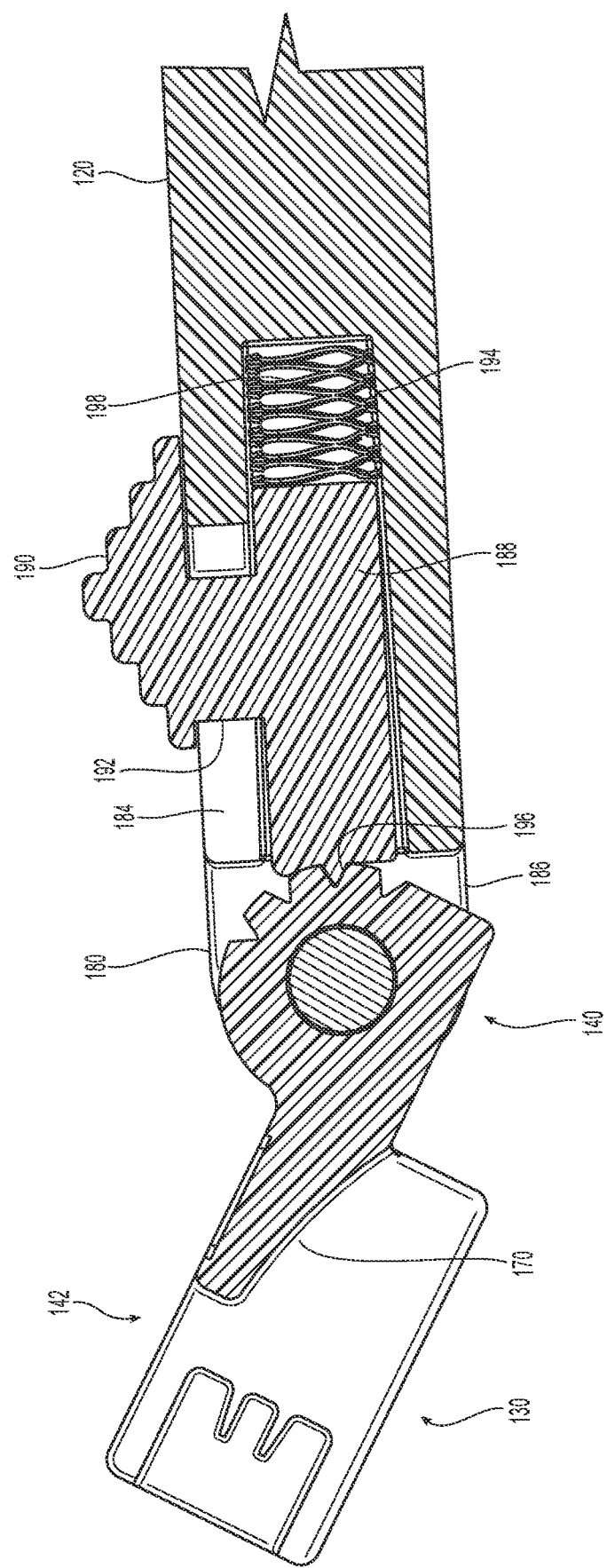
FIG. 6 is a cross sectional view of the insertion portion of the tool in FIG. 1 with the projection inserted into one of the recesses in the insertion head.

As illustrated in FIG. 6, the lock beam 188 is moved forward in a direction toward the insertion head 130 (as compared to FIG. 5). A projection 196 on the front of the lock beam 188 is disposed within one of the plurality of recesses 150 and between two of the plurality of cogs or projections 152 on insertion portion 122. This secures or fixes the insertion head 130 in relation to the handle 120. After pulling the lock beam 188 rearward to disengage the insertion head 130, a user can rotate the insertion head 130 relative to the handle 120 to a position that best allows for insertion of the MT-type fiber optic ferrule 102 into the adapter 104. The user can then release the lock tab 190 allowing the projection 196 on the lock beam 188 to engage one of the plurality of recesses 150.

Now moving to the other side of the handle 120 is the removal portion 124 for the removal head 132. See, FIGS. 13-18. The handle 120 has the same elements for the removal head 132 as it did for the insertion head 130—the two tabs 280 defining a receiving space 282; a lock cavity 284; a stop surface 286 to prevent the over rotation of the removal head 132; a lock beam 288 attached to a lock tab 290 by way of a lock neck 292 and having a projection 296; a spring cavity 294 that is at least partially in communication with the lock cavity 284; an elastic element to bias the lock beam 288 toward the receiving space 282. There is also indicia on the removal head 132 to make identification of the head easier.

As is clear from the figures, the lock tabs 190,290 are on opposing sides of the tool 100 along the longitudinal axis A-A. This also means that the tool 100 needs to be turned over to use the other head. However, the tool 100 could have the lock tabs on the same side if so desired.

Figure 13:
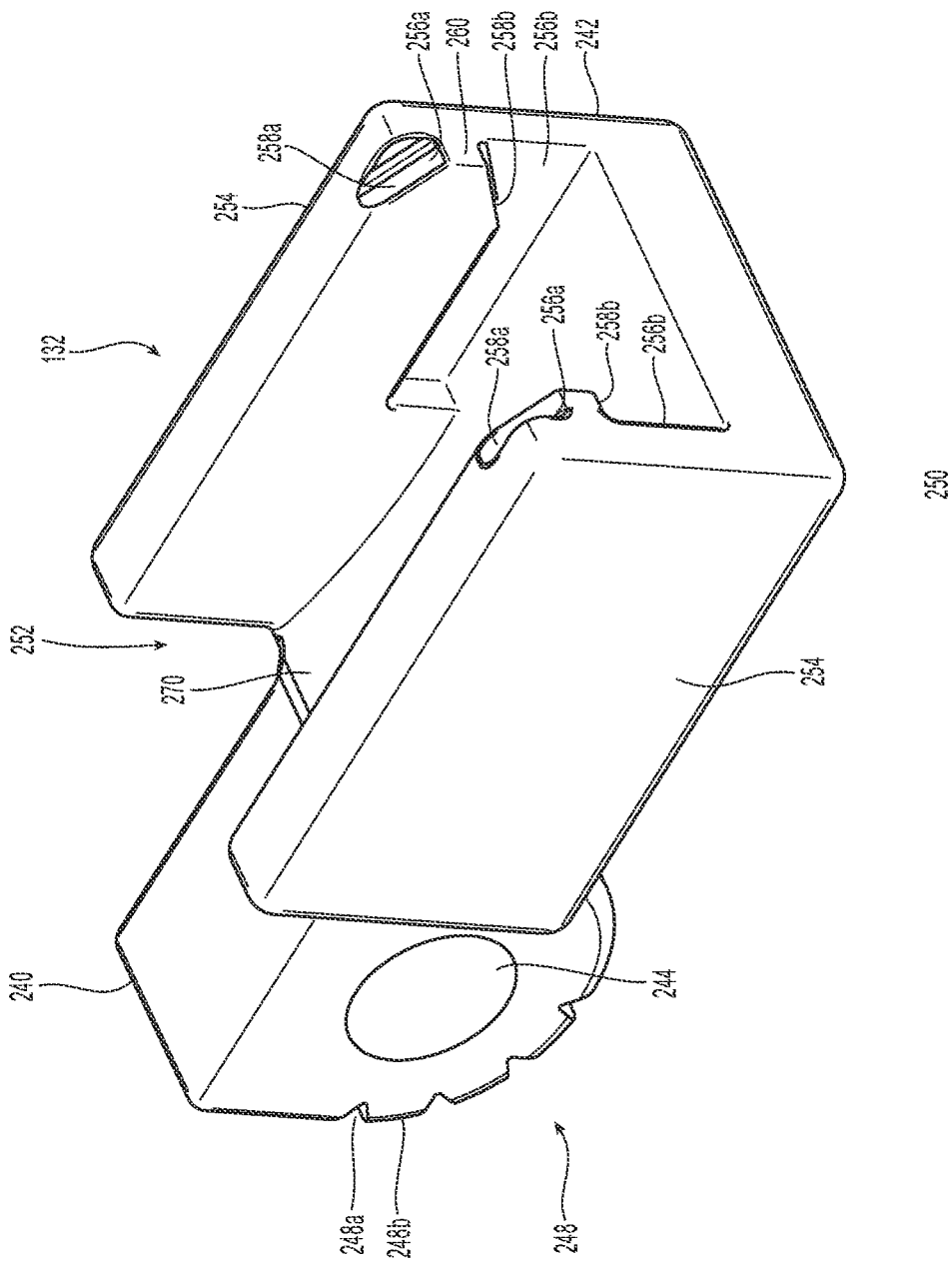
FIG. 13 is top perspective view of the removal head of the tool in FIG. 1.
Figure 14:
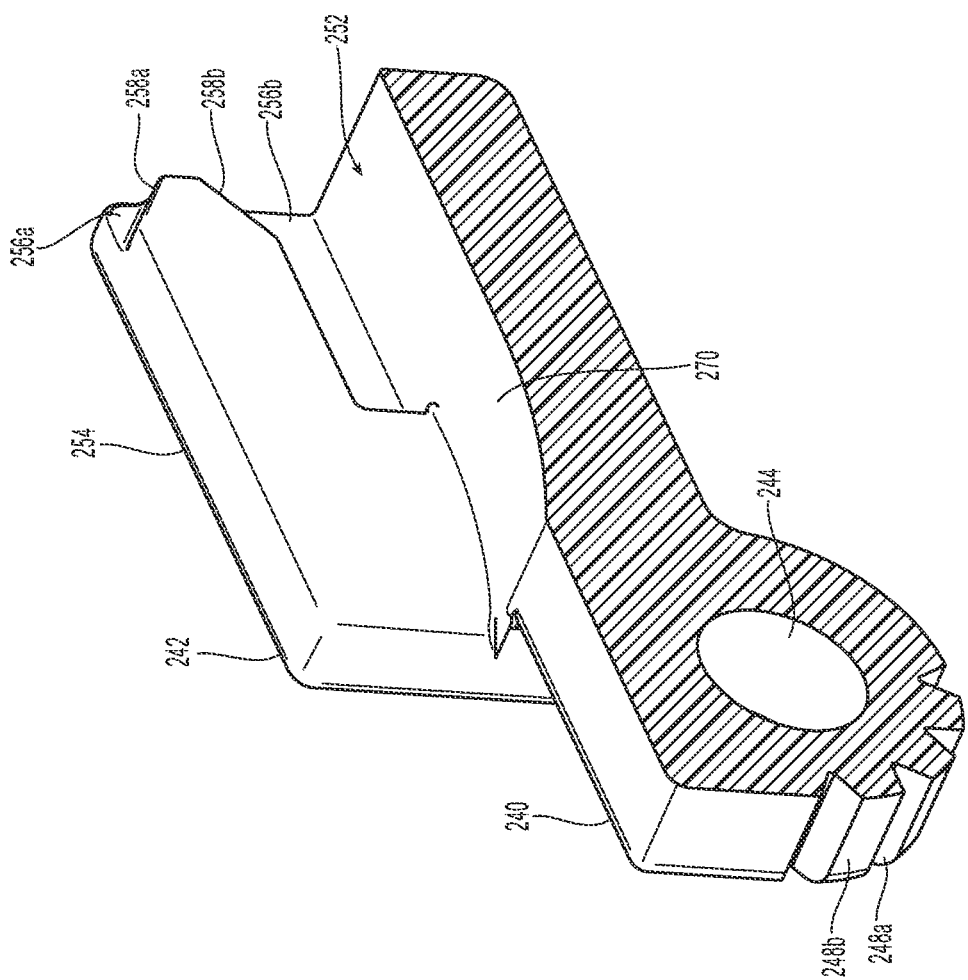
FIG. 14 is a cross section view of the removal head of the tool in FIG. 1.
Figure 15:
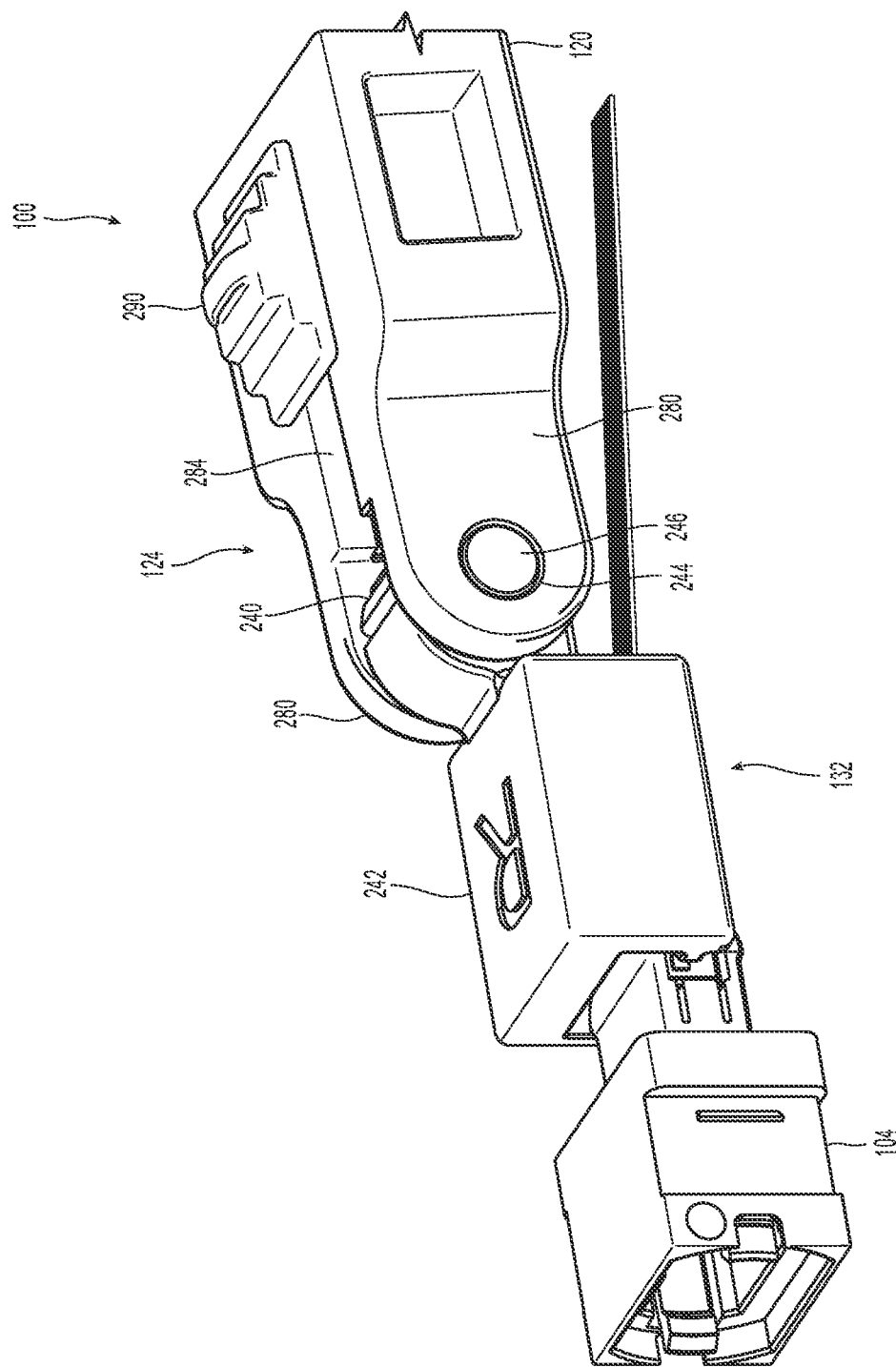
FIG. 15 is a perspective view of the bottom of the removal head of the tool in FIG. 1 beginning to engage the adapter.
Figure 16:
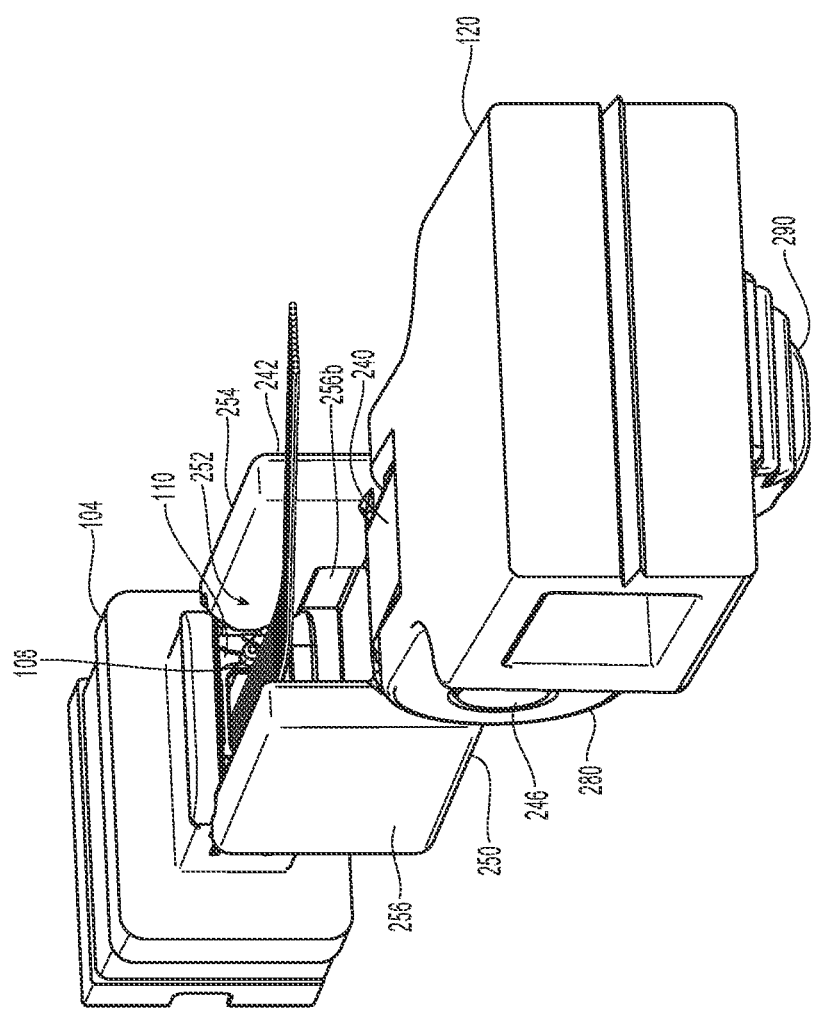
FIG. 16 is a perspective view from the handle toward the removal head showing the engagement of the removal head with the latches in the adapter and the routing of the optical fibers in the removal head.
Figure 17:
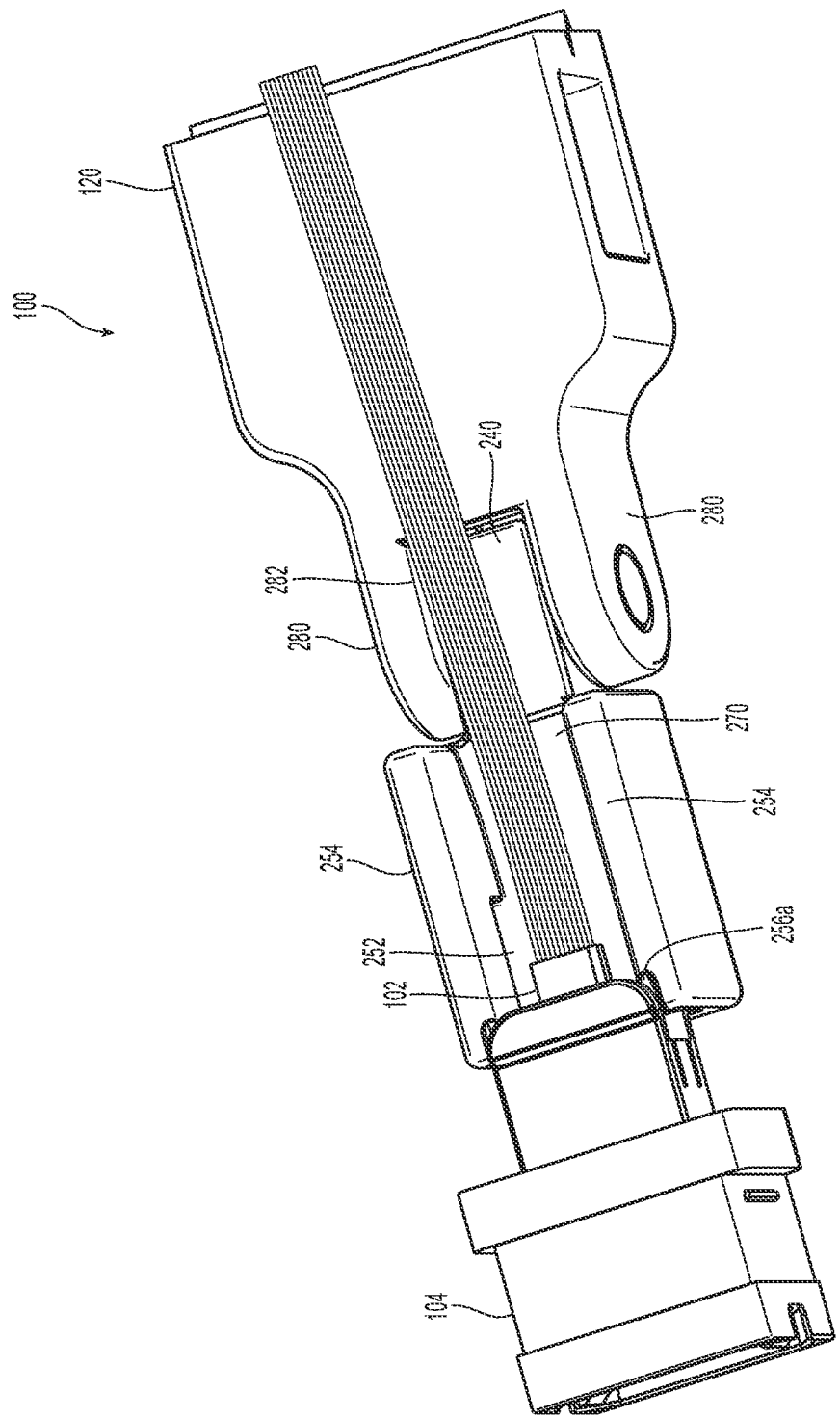
FIG. 17 is a view of removal head of the tool beginning to engage the adapter shown in FIGS. 15 and 16.
Figure 18:
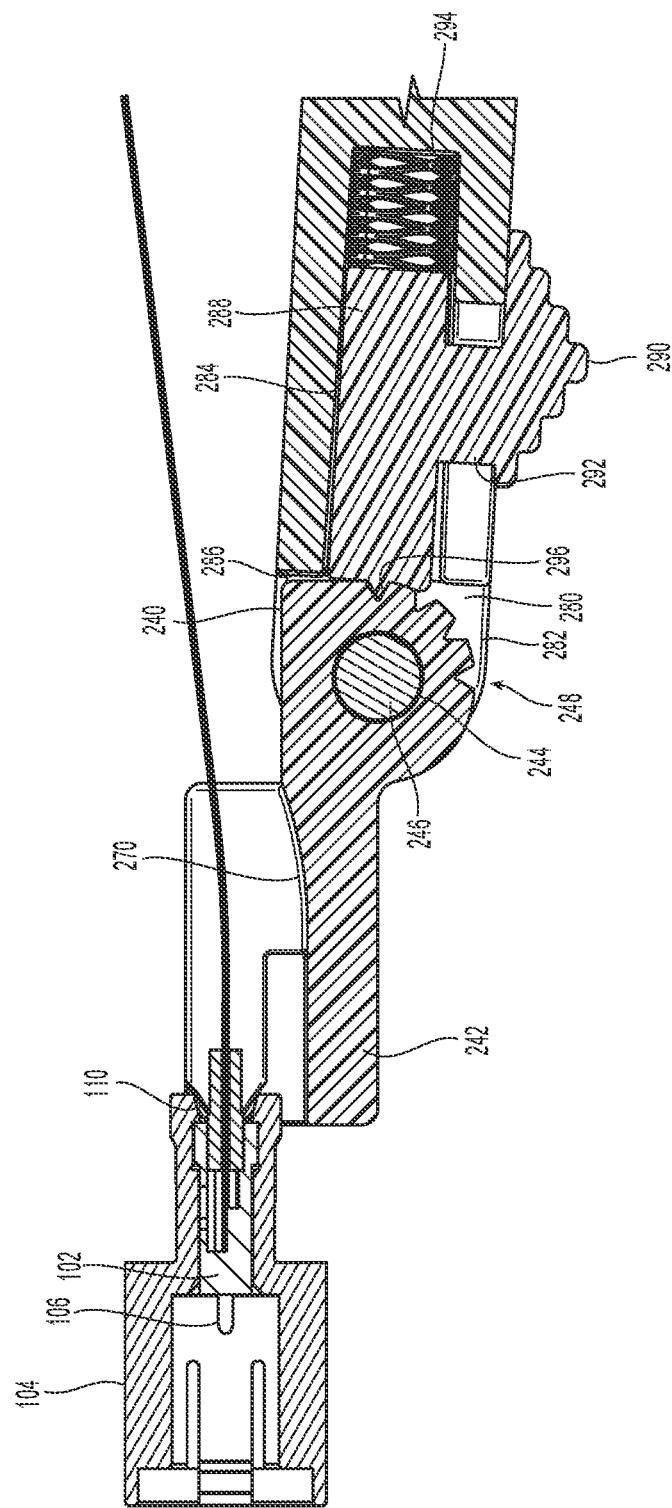
FIG. 18 is a cross sectional view of the removal head the latches in the adapter and the routing of the optical fibers in the removal head.

The removal head 132 is also similar in construction to the insertion head 130. The removal head 132 has a first portion 240 to engage the handle 120 and a second portion 242 to engage the adapter 104 and the MT-type fiber optic ferrule 102. The first portion 240 as best seen in FIG. 13, has a pin hole 244 to receive a pin 246 and about which the removal head 132 can rotate relative to the handle 120 between different locked positions. The first portion 240 also has a circular portion 248 with a plurality of recesses 248a and a plurality of cogs or projections 248b. The plurality of recesses 248a and the plurality of cogs or projections 248b, in combination with the projection 296 disposed in the handle 120, also allow for a user to rotate the removal head 132 relative to the handle 120 to allow the best approach to the adapter 104 when inserting an MT-type fiber optic ferrule 102 in the adapter 104. It should also be noted that the second portion 242 is offset from the center of the first portion 240 (the center of the pin hole 244). See FIGS. 14, 15, and 17. The center of the pin hole 244 is aligned with a top surface 250 of the second portion 242, but it could aligned with other parts of the second portion 242, as long as the tool 100 would still be able to function as described herein. See also FIGS. 19 and 20.

The second portion 242 has an opening 252 that is at least partially defined by two head extensions 254, the opening 252 allowing at least a portion of the adapter 104 to be received therein. See FIGS. 14 and 16. The second portion 242, and the head extensions 254 in particular, have a number of cut-outs to assist in removing the MT-type fiber optic ferrule 102. Each of the two head extensions 254 have two cut-outs 256a and 256b to form two reduced portions in the thickness of the two head extensions 254. These cut-outs form an upper latch ramp 258a and a lower latch ramp 258b. The lower cut-out 256b extends rearwardly (toward the first portion 240) to receive a portion of the adapter latch. See FIGS. 13, 16, and 18. Between the two cut-outs 256a and 256b, there is a forward facing surface 260 that prevents the removal head 132 from being inserted too far into the adapter 104, in one embodiment, by engaging a side tab on the adapter.

The upper latch ramp 258a and the lower latch ramp 258b engage the adapter latches and move them upward and downward, respectively, thereby freeing the MT-type fiber optic ferrule from the adapter latches and allowing a user to remove the MT-type fiber optic ferrule 102 by gently pulling on the optical fibers. To assist with this process is an optical fiber ramp 270 that is disposed between the two head extensions 254. See FIG. 14. Since the MT-type fiber optic ferrule 102 inserted into the adapter 104 already has optical fibers (typically an optical fiber ribbon) secured therein, the optical fibers are routed between the two head extensions 254. See FIGS. 16 and 17. The optical fiber ramp 270 allows for appropriate handling of the optical fibers to prevent any bending or breaking thereof. The removal head 132 may also have indicia (e.g., the letter "R") on one side thereof to allow for easier recognition of the particular head as noted above for the insertion head 130.

Figure 19:
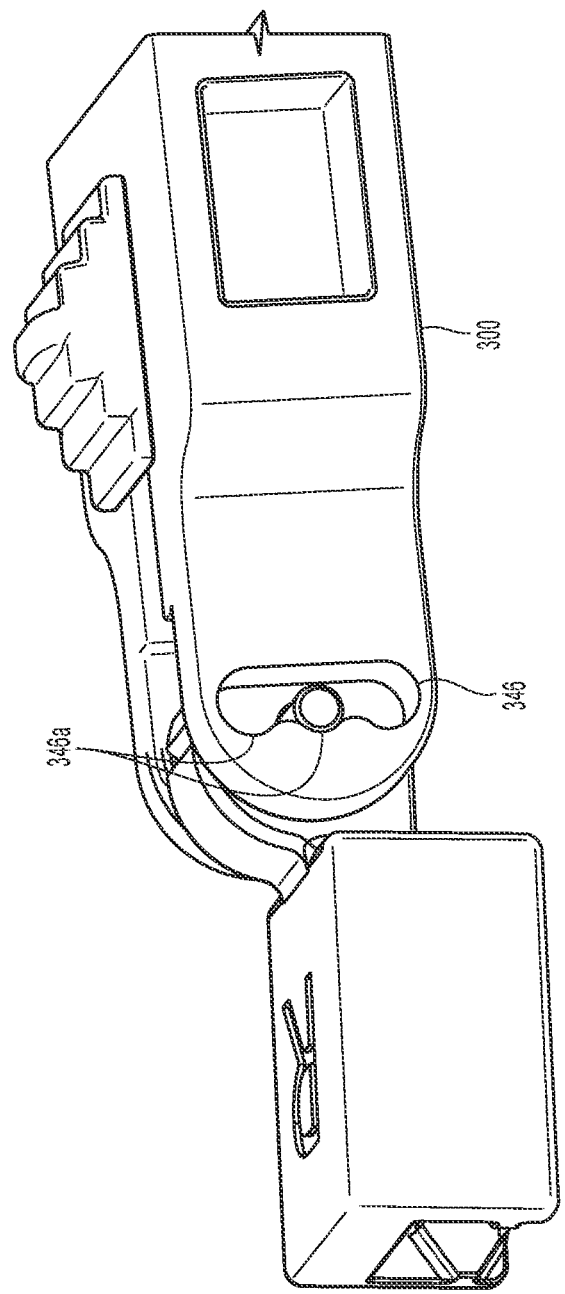
FIG. 19 is a perspective view of another embodiment of a tool for inserting and removing an MT-type fiber optic ferrule from an adapter according to the present invention.

Another embodiment of a handle 300 according to the present invention is illustrated in FIG. 19. The handle 300 is similar in all aspects to the handle 120, except that the receptacles 346 to receive the pins 146,246 may be elongated with divots 346a rather than the circular shaped pinhole 144, 244 as in the handle 120. The pins 146,246 may be moved between the divots 346a to further adjust the relationship of the handle 300 to the heads. When the projection on the lock beam is disposed within one of the plurality of recesses of the head, the heads will be retained within the divots 346a. A forward bias is provided continuously to heads by the elastic element to hold the heads stead between the divots 346a.

Figure 20:
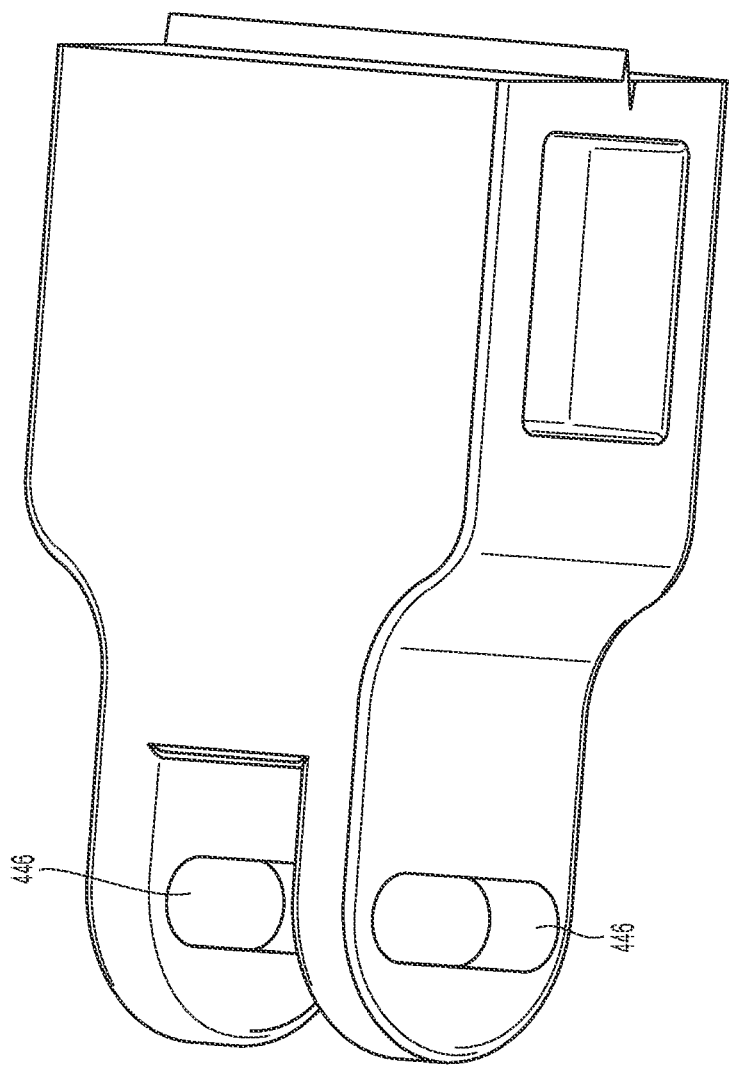
FIG. 20 is a perspective view of a tool for inserting and removing an MT-type fiber optic ferrule from an adapter according to the present invention.

Alternatively in another embodiment of a handle 400, the receptacles 446 to receive the pins 146,246 may simply be elongated as illustrated in FIG. 20. Both variations in FIGS. 19, 20 add an additional degree of freedom for the movement of the heads to adjust and secure positioning thereof.

It should also be noted that the insertion head 130 and the removal head 132 could be removably attached to the handle 120 and there only be one location for the attachment of the heads to the handle 120. While this may allow for a shorter and more compact handle 120, the user would have to keep track of the two different heads and particularly the one that is not currently attached to the handle 120. It is also noted that the removal side may be more beneficial to a user than the insertion side. While it is not without its challenges, the insertion of the MT-type fiber optic ferrule 102 is easier to do without a tool than it is to remove the MT-type fiber optic ferrule 102 without one. Thus, it is within the scope of the present invention to have only one head on a handle, the removal head.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. A tool for inserting and removing an MT-type fiber optic ferrule from an adapter comprising:
    a handle having an insertion portion at a first end and a removal portion at a second end;
    an insertion head movably coupled to the insertion portion of the handle; and
    a removal head movably coupled to the removal portion of the handle, wherein the insertion head and the removal head are movable in the same plane relative to the handle,
    wherein the insertion head and the removal head can be inserted into the adapter to insert and/or remove an MT-type fiber optic ferrule from the adapter and has a plurality of cogs and a plurality of recesses, each of the plurality of cogs being separated by one of the plurality of recesses and the recesses are configured to receive a projection of the handle, the insertion head being in a fixed position relative to the handle when the projection is inserted into one of the plurality of recesses.

2. The tool according to claim 1, wherein the insertion head has two projections to engage a back side of the MT-type fiber optic ferrule.

3. The tool according to claim 2, wherein each of the projections have an outer ramped surface to engage and spread latches on the adapter.

4. The tool according to claim 1, wherein the insertion head has receptacles to receive a portion of guide pins extending from the MT-type fiber optic ferrule whereby the guide pins do not engage the insertion head.

5. The tool according to claim 1, wherein a portion of the insertion head fits inside an opening in the adapter configured to receive the MT-type fiber optic ferrule.

6. The tool according to claim 1, wherein the removal head has a u-shaped configuration, the u-shape configuration having two side walls and a bottom wall to create a receiving area, the side walls having an interior surface, the interior surfaces having sloped surfaces to engage latches on the adapter.

7. The tool according to claim 1, wherein the removal head has a plurality of cogs and a plurality of recesses, each of the plurality of cogs being separated by two of the plurality of recesses and vice versa.

8. The tool according to claim 7, wherein the recesses are configured to receive a projection associated with the handle, the removal head being in a fixed position relative to the handle when the projection is inserted into one of the plurality of recesses.

9. The tool according to claim 1, wherein a portion of the removal head fits inside an opening in the adapter that is configured to receive the MT-type fiber optic ferrule.

10. The tool according to claim 9, wherein a portion of the removal head fits inside the opening in the adapter at the same time that the MT-type fiber optic ferrule is inserted.

11. A tool for inserting and removing an MT-type fiber optic ferrule from an adapter comprising:
    a handle having a removal portion; and
    a removal head movably coupled to the removal portion of the handle,
    wherein the removal head is movable between a plurality of positions relative to the handle and can be inserted into the adapter to engage and remove an MT-type fiber optic ferrule inserted into the adapter and the removal head has a plurality of cogs and a plurality of recesses, each of the plurality of cogs being separated by one of the plurality of recesses and the recesses are configured to receive a projection of the handle, the removal head being in a fixed position relative to the handle when the projection is inserted into one of the plurality of recesses.

12. The tool according to claim 11, wherein a portion of the removal head fits inside an opening in the adapter that is configured to receive the MT-type fiber optic ferrule.

13. The tool according to claim 11, wherein a portion of the removal head fits inside the opening in the adapter at the same time that the MT-type fiber optic ferrule is inserted.

14. A combination tool for handling an MT-type fiber optic ferrule comprising:
   a handle; and
   a moveable head movably coupled to the handle,
   wherein the moveable head is movable between a plurality of positions relative to the handle and is configured to engage an MT-type fiber optic ferrule to either release the MT-type fiber optic ferrule from an adapter or to insert the MT-type fiber optic ferrule into the adapter, and the moveable head has a plurality of cogs and a plurality of recesses, each of the plurality of cogs being separated by one of the plurality of recesses and the recesses are configured to receive a projection of the handle, the moveable head being in a fixed position relative to the handle when the projection is inserted into one of the plurality of recesses.

15. The combination tool according to claim 14, wherein the movable head is rotatably coupled to the handle.

16. The combination tool according to claim 14, wherein the movable head is rotatable between a first position and a secure second position relative to the handle.

* * * * *